United States Patent [19]

Varenchuk et al.

[11] Patent Number: 4,994,644
[45] Date of Patent: Feb. 19, 1991

[54] APPARATUS FOR OVERHEAD SUBMERGED ARC WELDING

[76] Inventors: Pavel A. Varenchuk, ulitsa Prazhskaya, 3, kv. 426; Valentin D. Kovalev, ulitsa Malo-Kitaevskaya 58, kv. 2; Vsevolod N. Bernadsky, ulitsa A. Barbjusa, 22/26, kv. 15; Vladimir F. Biitsev, prospekt Mitra, 13v, kv. 10, all of Kiev; Pavel S. Nefedov, ulitsa Gagarina, 6, kv. 84, Donetskaya oblast, Zhdanov; Valentin P. Sadikov, ulitsa Granitnaya, 110, kv. 67, Donetskaya oblast, Zhdanov; Evgeny N. Chilibin, prospekt Metallurgov, 127a, kv. 114, Donetskaya oblast, Zhdanov, all of U.S.S.R.

[21] Appl. No.: 460,955
[22] PCT Filed: Dec. 14, 1988
[86] PCT No.: PCT/SU88/00264
§ 371 Date: Feb. 27, 1990
§ 102(e) Date: Feb. 27, 1990
[87] PCT Pub. No.: WO89/11946
PCT Pub. Date: Dec. 14, 1989

[30] Foreign Application Priority Data
Jun. 6, 1988 [SU] U.S.S.R. ............................. 4429055

[51] Int. Cl.⁵ ............................................. B23K 9/18
[52] U.S. Cl. ............................................. 219/73.2
[58] Field of Search ........................... 219/73, 73.2

[56] References Cited

FOREIGN PATENT DOCUMENTS

| 3430349 | 2/1986 | Fed. Rep. of Germany . |
| 2568808 | 2/1986 | France . |
| 469554 | 7/1975 | U.S.S.R. . |
| 1232418 | 5/1986 | U.S.S.R. . |
| 1335395 | 9/1987 | U.S.S.R. . |
| 1348112 | 10/1987 | U.S.S.R. . |

Primary Examiner—Clifford C. Shaw
Attorney, Agent, or Firm—Lilling and Lilling

[57] ABSTRACT

An apparatus for overhead submerged arc welding has a hopper containing flux being pivotally mounted on a suspension for rotation about the suspension axis, the hopper having a bowl provided in the top part thereof, a welding head with a nozzle for supplying a consumable electrode, and means for supplying flux and pressing it against work.

The apparatus also has a forming means mounted for swinging in its longitudinal and transverse planes and for a vertical adjustment with respect to the work being welded. The forming means is in the form of a U-shaped body having its open top part facing towards the work being welded and legs having on the side of the nozzle a pair of diverging wedge-shaped projections, an adjusting bar being provided inside the body to extend lengthwise of the joint being welded. Copying members in the form of four wheels are provided outside the body on either side of the legs thereof.

This construction of the forming means ensures maintenance of preset flux pressures at various points along the joint being welded.

3 Claims, 1 Drawing Sheet

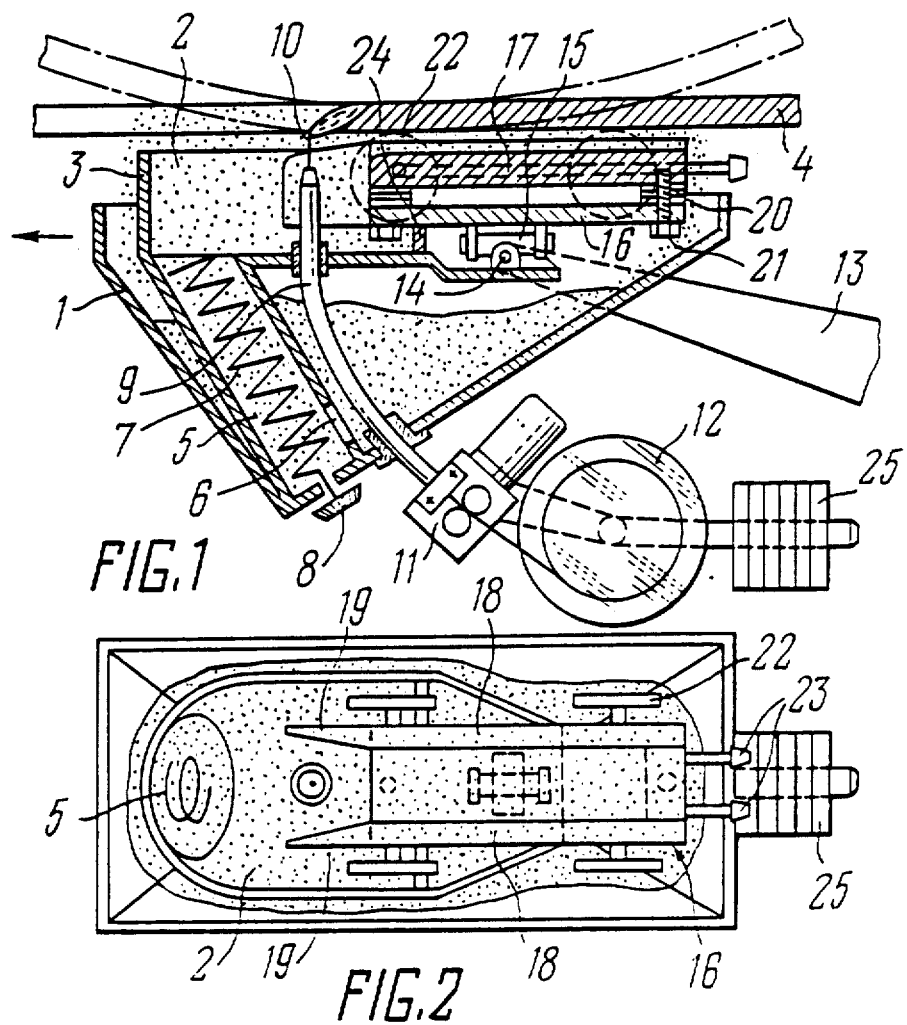
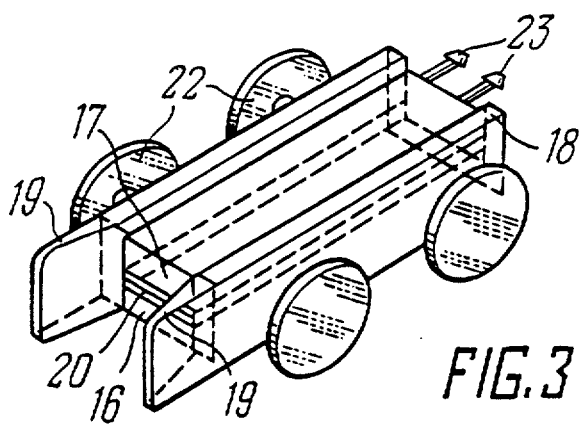

APPARATUS FOR OVERHEAD SUBMERGED ARC WELDING

BACKGROUND OF THE INVENTION

1. Field of the Invention

The invention relates to the equipment for arc welding, in particular, and it deals with an apparatus for overhead submerged arc welding.

2. Description of the Related Art

A large volume of operations in the manufacture of welded structures is carried out in welding rotatable annular joints of hollow structures with a restricted access to joints being welded on the inner side of the structure. Such joints include annular joints of closed vessels, annular joints of pipelines, tanks, casings, field welds and shell plating seams of ship hulls; longitudinal joints of large-area products which cannot be positioned to facilitate welding. They also include joints of difficult-to-position webs, segments, three-dimensional and planar sections, and the like.

A submerged arc overhead welding method is characterized in that a consumble electrode and a welding bath are turned at 180° in comparison with downhand welding. Flux an electrode are fed to the work from bottom up, i.e. as though towards a ceiling, the electrode being supplied through a compacted flux.

This welding method is referred to hereinbelow as overhead submerged arc welding.

This welding method is referred to as the overhead submerged arc welding also because the arc is in the body of metal.

So called overhead welds are produced as a result of such welding.

Overhead welds may be of different types, e.g. penetration overhead welds, sealing overhead welds. There may be one-pass overhead welds and other types of overhead welds.

The penetration overhead welds are welds which are first to be produced in welding a joint and which are located in the top part of sections being welded on the joint side opposite with respect to the electrode supply. Further welding of the joint, i.e. producing the necessary subsequent welds is carried out by any appropriate known method, the electrode being supplied on the same side as is the case with welding of the overhead penetration weld, e.g. the inner penetration welds of rotatable annular joints of vessels, tanks, joints between bottom sections of shell plating of ships and other structures.

The overhead penetration weld arc welding allows, to a large extent, the operation of welding from the interior of a vessel to be dispensed with in welding rotatable annular welds, and welding in confined spaces in producing straight welds of structures with a restricted access on the side of a ceiling can also be eliminated.

The sealing overhead welds are welds which are first to be produced in welding a joint and which are located in the bottom part of sections being welded on the electrode supply side of the joint. Further welding is carried out by any appropriate known method with the electrode supply on the side of the joint being welded opposite to that used in the overhead welding.

In practice, the penetration overhead welds are produced in welding annular and longitudinal joints of structures with a restricted access to joints being welded from the inside, the sealing welds being produced in welding longitudinal joints of difficult-to-position products, e.g. plate structures made out of segments, and other products.

One-pass overhead welds include welds produced in welding joints of a limited thickness arranged over the whole welded section. No further welding of the joint on any side thereof will be required.

Welding of sealing and one-pass welds poses many problems concerned with the formation of the surface of a finished weld.

During the overhead welding, the welding bath metal formed during arcing by fusion of the metal being welded, electrode material and flux is retained by a crust of partly melted flux and also by means of forming members. The forming members may be of various shapes and size and may be made, e.g. in the form of plates, backings, bars, sliders and other members and structures.

Flux is pressed against the welding zone positively from bottom up and, as flux is being consumed, its stock is continually replenished. For forming the top part of a weld, flux may be supplied both on the bottom side, through the gap between the edges of a product being welded, and from top by any appropriate known method by which a filled layer of flux is formed. Special forming backings or flux holding means may also be used.

Numerous problems arise especially in welding hard to get at joints of large-size products of cylindrical or like configuration such as ship hulls and boiler units where especially high quality of welds is required and where the products must be rotated about their axis during welding operations, as well as in welding large-area planar products which it is very difficult to place in a position facilitating the welding.

Known in the art is an apparatus for overhead submerged arc welding (SU, A, 469554), comprising a hopper containing flux and a bowl for supplying flux thereto and for pressing flux against the work. The bowl has an outlet port facing towards the joint being welded and an inlet port for supplying flux to the bowl and for creating a desired pressure of flux in the bowl. Flux is supplied by a pipe communicating with the inlet port of the bowl. The pipe has a flux supply means in the form of an auger.

A welding nozzle through which the consumable electrode is supplied is provided in the bowl adjacent to the inlet port and a pivotally mounted adjusting plate located downstream of the welding nozzle is provided on the side of the bowl opposite to the inlet port.

For varying the angle of inclination with respect to the outlet port of the bowl, the adjusting plate has an adjusting screw.

This apparatus provided with the adjusting plate allows preset flux pressure to be controlled during welding at different points along the joint being welded.

During welding by means of this apparatus, the operator keep an eye on the joint being welded and, if parameters of the joint, e.g. the amount of clearance between the edges of the structure deviate from preset values, the operator can correct the situation by acting upon the screw to vary the angle of inclination of the plate so as to maintain the desired flux pressure since it is very important that preset flux pressure values for high-quality overhead welding be maintained with maximum possible accuracy at various points along the joint being welded because otherwise the weld would be of poor quality.

The abovedescribed apparatus cannot, however, ensure an automatic maintenance of preset flux pressure values at various points along the joint being welded without operator's interference. During welding with this apparatus, it is necessary to continually vary position of the adjusting plate so that the operator must be continually involved and must pay a special attention during welding, the operator having to be very skillful. Consequently, quality of weld in welding with the aid of this apparatus depends on the operator's skill and experience which may not unfrequently result in low-quality welds.

In addition, the experience of operation of such an apparatus showed that it is suitable for welding joints having minimum deviations of parameters of their assembly before welding (e.g. misalignment of the plate edges, gap, V-section, etc.) and cannot be used for welding elongated products or annular joints, especially of large-diameter structures.

Known in the art is an apparatus for overhead arc welding (FR, B, 2568808), comprising a hopper containing flux and accommodating a bowl having an inlet port and an outlet port, the inlet port communicating with a flux supply pipe. A welding nozzle for supplying a consumable electrode is provided in the bowl. The bowl cooperates with a forming means having an adjusting bar for providing different pressures of flux at various points along the joint being welded, a part of the forming means being located directly in the bowl, adjacent to the consumable electrode.

The hopper supports a means for supplying the electrode to the welding nozzle, and the hopper is mounted on a suspension by means of a pivot pin for rotation about this pivot pin and has a point-like contact copying member which is located substantially in line with the adjusting bar. The adjusting bar also has a pair of copying members and is mounted for longitudinal and transverse swinging movements.

In addition, the hopper is provided with a means for pressing the hopper proper and the copying member against the work being welded.

This apparatus for overhead welding can substantially automatically maintain the stability of flux pressures necessary for carrying out high-quality welding at various points along the joint being welded. Participation of the operator in controlling welding process is substantially dispensed with, especially in welding elongated products of a regular geometry (and more especially, of cylindrical and straight products), deviations from joint assembly parameters before welding being compensated for.

This apparatus makes it possible to implement the method of overhead submerged arc welding in which different present flux pressure values are automatically maintained at various points along the joint being welded during welding so as to produce high-quality penetration overhead welds.

This construction of the apparatus ensures a reliable retention of a welding bath during welding at the level of the joint being welded and the formation of high-quality welds with the desired formation of reinforcement on the inner side of the weld (on the side opposite to the ceiling), i.e. in producing penetration overhead welds.

However, the welds produced in this manner have deviations of shape of the outer side of the finished weld admissible for the penetration weld, in the form of irregularities, undercuts, local weld width fluctuations and other defects on the outer side of the weld which will require further rewelding to provide a next layer.

These defects in forming the outer side of the weld can be explained by inadequate conditions provided by this apparatus for jamming and retaining flux at various points before the formation of welding bath and in the welding zone. In addition, this apparatus does not allow high-grade copying of the surface of the welded joint to be carried out directly adjacent to the point of welding which is necessary to producing sealing overhead welds, and especially one-pass overhead welds.

Moreover, this apparatus cannot provide maximum favorable conditions for copying position of the working surface of the bar with respect to the surface of the joint being welded in cases of a substantial deviation of its surface from regular geometry. This is due to the relative position of the copying members and their position with respect to the welding bath which is not quite optimum as it is necessary for producing sealing and one-pass overhead welds. Investigations have shown that the copying members should be located as close as possible to the welding bath (welding zone).

SUMMARY OF THE INVENTION

The main object of the present invention is to provide an apparatus for overhead submerged-arc welding in which corresponding construction of a forming means, an adjusting bar and copying members and their relative location with respect to a welding zone (welding bath) would allow automatic welding of overhead welds, preferably back-up single-pass welds and, avoid conditions for jamming and retaining flux in the welding zone, and creation and maintenance of preset flux pressure on different parts along the joint being welded required for production of high-quality welds with enlarged range of parts being welded which is (as during welding in the bottom position).

This object is accomplished by an apparatus for overhead submerged arc welding, comprising a hopper containing flux pivotally mounted on a suspension for rotation about a pivot pin, having a welding head provided with a nozzle for supplying a consumable electrode and means for supplying flux and pressing it against the work in the nozzle zone, a bowl accommodated in the hopper, the end of the nozzle for supplying the consumable electrode extending through the bowl, and a forming means, having an adjusting bar for providing preset pressures at various points along the joint being welded, mounted on the suspension, having copying members, and mounted for swinging movements in the longitudinal and transverse planes of the forming means and for vertical adjustment with respect to the work. According to the invention, the forming means comprises a U-shaped body having its open top part facing towards the work, the legs of the body having, on the nozzle side, a pair of diverging wedge-shaped projection, the adjusting bar being provided inside the U-shaped body along the joint being welded, and the copying members being placed outside the U-shaped body on either side of its legs.

This construction of the apparatus in which the forming means is in the form of the U-shaped body makes it operable at high loads. The apparatus is versatile and can receive adjusting bars for providing preset flux pressures at various points along the joint being welded, the bars being vertically adjustable. The level at which the working face of the adjusting bar is located may be either below that determined by the height of the legs of the U-shaped body (e.g. in welding joints without edge preparation) or above. e.g. in welding V-section joints where the working face of the adjusting bar is in the form of a projection.

The working face here and below is the surface of the adjusting bar which cooperates with melt in the welding bath and with the weld being formed during welding.

In carrying out welding with minimum preset reinforcement of the weld, the level at which the working face of the adjusting bar is located may be aligned with that determined by the leg height of the body, i.e. it may be aligned with the leg end faces.

In addition, the U-shaped configuration of the body, i.e. the confuration that does not have end and top walls, allows the adjusting bars of any length to be provided in the body.

The body walls having in the front part thereof a pair of diverging wedge-shaped projections and having their upper end faces located the closest possible to the surface of a work ensure the desired jamming and retention of flux during welding in the zones upstream of the welding bath and along the welding bath and downstream thereof up to the formed weld.

In other words, the provision of a pair of diverging wedge-shaped projections in the front part of the body, which protrude beyond the front end face of the forming means in the direction towards the nozzle, ensures stabilizing of preset flux pressures in the zone immediately adjacent to the work at various points of formation of the welding bath, i.e. along the whole length beginning from the point of location of the nozzle and up to the final formation of the weld thus greatly enhancing quality of welding.

It is preferred that the legs of the U-shaped body having the wedge-shaped projections be removable.

This construction of the legs of the body makes it possible to enlarge the range of parts being welded. It should be noted that size and configuration of the upper end faces of the removable legs are chosen in accordance with welding conditions and geometry of joints being welded.

In addition, this construction of the body having the removable legs which are provided with the diverging wedge-shaped projections in the nozzle zone allows the apparatus to be used for welding products having different shapes. It would only take to change the configuration of their upper end faces to fit the shape of the product.

It is preferred that the copying members in the apparatus according to the invention comprise four wheels, the wheels being arranged in twos on either side of the leg of the U-shaped body and positioned in a spaced relation to each other.

This construction of the copying members in the form of four wheels arranged on either side of the body of the forming means allows high-quality (without jerks, shakes and other perturbances) and stable copying of the surface of the joint being welded to be ensured in the direct vicinity to the welding zone, the temperature effect on the part of the body upon the copying members being eliminated which is especially important in carrying out high-temperature welding.

The provision of the copying members in the form of wheels is most suitable as this facility allows welding to be carried out with substantial defects of surface finish.

Four copying wheels arranged in twos on either side of the legs of the U-shaped body and positioned in a spaced relation to each other ensure maximum stability of the forming means and provide most favorable conditions for copying and for the equidistant position of the working face of the adjusting bar with respect to the surface of the joint being welded. This construction of the forming means makes it possible to provide a stable and compact apparatus featuring a very high sensitivity to fluctuations of the profile of the surface of the joint being welded in the welding zone.

The apparatus is easy in manufacture, has small size and low weight and is comparatively inexpensive in manufacture.

Owing to the stability of all welding parameters. the apparatus ensures enhanced welding quality in comparison with the prior art.

BRIEF DESCRIPTION OF THE DRAWINGS

The invention will now be described with reference to its specific embodiment illustrated in the accompanying drawings, in which:

FIG. 1 schematically shows a longitudinal section view of an apparatus for overhead submerged arc welding according to the invention;

FIG. 2 is a plan view of the apparatus of FIG. 1;

FIG. 3 is a schematic perspective view of a forming means.

DESCRIPTION OF THE PREFERRED EMBODIMENT

An apparatus for overhead submerged arc welding according to the invention comprises a hopper 1 (FIG. 1) containing flux 2. The hopper 1 accommodates a bowl 3 for supplying flux 2 and for pressing it against the surface of a work 4 being welded.

The bowl 3 is in the form of a cup-shaped body, but can have any other configuration as well.

The bowl 3 has an outlet port facing towards the work 4 being welded. When supplied, flux 2 leaves the bowl 3 through the outlet port and, when the bowl 3 is pressed against the work 4 being welded during welding, creates a flux backing which ensures preset pressures at various points along the joint being welded, whereby high quality of overhead welds is ensured.

The flux backing is in the form of a layer of flux 2 exerting a constant pressure upon the work 4 being welded, which is uniformly distributed over the entire surface area of the backing.

The inlet port of the bowl 3 is connected to a pipe 5 for supplying flux 2 from the hopper 1 to the bowl 3. A port 6 in the wall of the pipe 5 is designed for admitting flux 2 from the hopper 1 to the pipe 5. Surplus flux 2 overflows through the bowl 3 and spills freely into the hopper 1.

Recirculation of flux 2 and its reuse are thus ensured. An auger 7 is provided in the pipe 5 lengthwise thereof and is coupled to a rotary drive (not shown in the drawing) by means of a gear 8. The pipe 5 and the auger 7 form a means for supplying flux 2 and pressing it against the work 4 being welded.

The hopper 1 accommodates a welding head having a nozzle 9 for supplying a consumable electrode 10, one end of the nozzle 9 being located in the bowl 3 and the other end attached to a means 11 for supplying electrode which supports a coil 12 mounted by means of an arm.

The hopper 1 is mounted on an arm 13 of a suspension by means of a pivot pin 14 for rotation about this pivot pin.

The bowl 3 and the pipe 5 for supplying flux 2 and the hopper 1 are rigidly interconnected and form an integral structure. A pivot joint 15 having two degrees of freedom is provided in the bottom part of the bowl 3 and supports a forming means a part of which is located in the bowl 3 adjacent to the nozzle 9 of the welding head. The forming means comprises a U-shaped body 16 having its open top part facing towards the work being welded, and an adjusting bar 17 is provided inside the body 16 lengthwise of the joint being welded. Two legs 18 (FIG. 2) of the body 16 have in the front part thereof a pair of diverging wedge-shaped projections 19. The wedge-shaped projections 19 protrude beyond the front end face of the body 16 in the direction towards the nozzle 9 (FIG. 1) and have their end faces located in the maximum vicinity to the surface of the work being welded so as to ensure the desired jamming and retention of flux during welding at points upstream of the welding bath, lengthwise of the welding bath, and downstream of the welding bath up to the formed weld.

Position of the adjusting bar 17 in the body 16 is vertically adjustable by means of removable inserts 20 (FIG. 3) and retainers 21 (FIG. 1). The pivot joint 15 is mounted in the bowl 3 in such a manner that its transverse axis is aligned with the pivot pin 14 of the hopper 1.

The legs 18 (FIG. 2) having the wedge shaped projection 19 may be removable so as to ensure a large range of applications of the forming means for various sizes and diameters of products being welded.

The U-shaped configuration of the body 16 which does not have end and top walls makes it possible to accommodate therein an adjusting bar 17 of any desired length in accordance with specific welding conditions. Copying members in the form of four wheels 22 (FIGS. 2, 3) are provided outside the body 16, the wheels 22 being arranged in twos on either side of the legs 18 of the body 16 and being positioned in a spaced relation to each other.

The wheels 22 are positioned in the vicinity to the welding bath so as to provide optimum conditions for copying the surface of the joint being welded during welding.

For providing optimum conditions for carrying out overhead welding, the wheels 22 (FIG. 3) may protrude beyond the upper end faces of the legs 18 of the body 16.

Placing the wheels 22 above the upper end faces of the legs 18 of the body 16 determined preset points of engagement and conditions for their contact with the surface of the work 4 being welded (FIG. 1) and also prevents the legs 18 of the body 16 (FIGS. 2, 3) from being worn.

In welding products having deviations of geometry and assembly specifications of the joints being welded, three wheels 22 out of four (FIG. 1) may be in contact with the work 4, and these may be any three wheels 22 out of four, the different wheels being in contact with the work surface during welding. The forming means thus remains stable at any moment and thereby enhances welding quality.

A clearance if formed during welding between the working face of the adjusting bar 17 and the surface of the work 4 being welded which is indispensable for overhead welding and which forms a so called flux interstice during welding. The amount of this clearance is determined in accordance with specific welding conditions (welding parameters, shape and size of reinforcement of the weld, flux type, and other conditions) and may be adjusted by placing the adjusting bar 17 in the body 16 and also by means of the copying members (e.g. by varying the diameter of the wheels 22).

The adjusting bar 17 (FIG. 3) of the forming means may have stub pipes 23 for supplying a coolant. The coolant may be in the form of water, air, antifreeze and other liquids, gases and fluid substances.

To avoid a pressure drop of flux 2 (FIG. 1) in the welding zone because of its spillage, a partition 24 of an elastic heat-resistant material is provided in the space between the bowl 3 and the adjusting bar 17.

The pivot pin 14 of the hopper 1 may be provided at any point in the hopper 1 and bowl 3, but at any rate it should be located under the forming means and positioned as close as possible to the surface of the work being welded (to the plane of the contact points of the wheels 22).

The apparatus may be supported on a movable carriage by means of the suspension arm 13, e.g. in welding longitudinal joints or on a carriage of a vertical slide (not shown in the drawings).

The apparatus is provided with counterweights 25 for controlling force pressing the bowl 3 against the work 4 (the force of pressure of flux 2 in the flux backing).

The abovedescribed apparatus functions in the following manner.

The apparatus is set up for a predetermined welding regime before welding by adjusting the desired pressure of flux 2 in the flux backing by appropriately positioning the counterweights 25; by adjusting the removable inserts 20 (FIGS. 1 and 3) and retainers 21 (FIG. 1) to adjust vertical position of the adjusting bar 17, and operating conditions of the auger 7, welding head and other components of the apparatus are also adjusted in accordance with the type of the joint being welded, geometry of the joint and work 4, and the like.

The amount of clearance between the upper end faces of the legs 18 of the body 16 and the work 4 being welded is also set up. The adjustment is carried out both by making choice of diameter of the wheels 22 (FIGS. 2, 3) and by making choice of appropriate change legs 18.

The wheels 22 are then pressed by the suspension (not shown in the drawings) and by a force transmitted thereby to the arm 13 (FIG. 1) and to the pivot pin 14 of the hopper 1 against the underside of the work 4 being welded. Upon engagement with the work 4 and pressure of the pivot pin 14, the wheels 22 are positioned with respect to the surface of the joint being welded, the working face of the adjusting bar 17 is set to a preset position, and position of the entire forming means supported by the pivot joint 15 copies the surface of the joint being welded during welding.

This support is necessary during welding to ensure the desired swinging of the hopper 1 about the pivot pin 14 on the suspension arm 13 of the hopper 1.

The hopper 1 is pressed against the work 4 together with the bowl 3 by the counterweights 25 rotating it about the pivot pin 14. The drive of the auger 7 (not shown in the drawings) is turned on, and during rotation of the gear 8 with the auger 7, flux 2 is admitted through the inlet port 6 and pipe 5 to the bowl 3 to build up the necessary flux pressure therein.

In welding longitudinal welds, the drive of the carriage for moving the apparatus along the joint being welded is turned on (the drive and the carriage for moving the apparatus are not shown in the drawings). In welding annular joints, the movement drive is not turned on, but a rotary drive for rotating the work is energized (not shown in the drawings).

A coolant, e.g. water is supplied to the stub pipes 23 for cooling the adjusting bar 17. Water flow and its temperature are controlled in accordance with specific welding conditions.

The supply means 11 is then turned on, and the electrode 10 is supplied from the coil 12 through the nozzle 9 towards the work 4, a voltage is applied to the electrode 10 to excite an arc. As the electrode 10 moves with respect to the work 4, the joint is welded.

The forming means supported by the pivot joint 15 is capable of swinging in its longitudinal and transverse planes during welding so as to ensure copying of the joint being welded by means of the wheels 22. The legs 18 (FIG. 2) of the U-shaped body 16 having the wedge-shaped projections 19 and the elastic partition 24 (FIG. 1) ensure retention of flux 2 in the welding zone and stabilize its preset pressure.

The forming means in the apparatus also functions as a copying member which allows position of the pivot pin 14 of the hopper 1 to remain equidistant with respect to the surface of the work 4 being welded.

Therefore, the apparatus for overhead submerged arc welding according to the invention ensures high quality of a large range of products being welded owing to the maintenance of flux pressure at various points of the weld being produced and enhanced copying of the surface of the joint being welded.

The apparatus allows welding to be carried out automatically so as to substantially eliminate operator's participation in the welding process.

The apparatus for overhead submerged-arc welding according to the invention may be used for welding of overhead welds of different types with a high-quality of reinforcement formation, especially, from the bottom side of a weld. To the most advantage the apparatus may be used for welding back-up and single-pass overhead welds.

We claim:

1. An apparatus for overhead submerged arc welding, comprising: a hopper containing flux pivotally mounted on a suspension for rotation about a pivot pin, having a welding head provided with a nozzle for supplying a consumable-electrode and means for supplying flux and pressing it against a work being welded in a zone of the nozzle, a bowl accommodated in the hopper, an end of the nozzle for supplying the consumable electrode extending through the bowl, and a forming means having an adjusting bar for providing a preset pressure at various points along a joint being welded, mounted on the suspension, said forming means having copying members and being mounted for swinging movements in the longitudinal and transverse planes and for vertical adjustment with respect to the work being welded, the forming means comprising a U-shaped body having an open top part facing towards the work being welded, legs of the body having, on the side of the nozzle, a pair of diverging wedge-shaped projections, the adjusting bar being provided inside the U-shaped body along the joint being welded, and the copying members being placed outside the U-shaped body on either side of its legs.

2. An apparatus for overhead submerged arc welding according to claim 1 wherein the legs of the U-shaped body having the wedge-shaped projections are removable.

3. An apparatus for overhead submerged are welding according to claim 1, wherein the copying members comprise four wheels, the wheels being arranged in twos on either side of each leg of the U-shaped body and being positioned in a spaced relation to each other.

* * * * *